(12) United States Patent
Kageyama et al.

(10) Patent No.: US 7,800,791 B2
(45) Date of Patent: Sep. 21, 2010

(54) IMAGE SENSOR

(75) Inventors: Mitsuaki Kageyama, Hamamatsu (JP); Seiichiro Mizuno, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 1040 days.

(21) Appl. No.: 11/455,218

(22) Filed: Jun. 19, 2006

(65) Prior Publication Data

US 2007/0002407 A1 Jan. 4, 2007

(30) Foreign Application Priority Data

Jun. 20, 2005 (JP) .......................... P2005-179466

(51) Int. Cl.
*H04N 1/04* (2006.01)

(52) U.S. Cl. ...................... 358/474; 358/483; 358/514; 358/482; 358/530; 348/207.99; 348/318; 348/372; 356/489; 356/497; 250/208.1

(58) Field of Classification Search ................ 358/514, 358/483, 482, 513, 530, 409, 474; 348/207.99, 348/318, 372, 308; 356/489, 497, 485, 326; 250/370.09, 208.1
See application file for complete search history.

(56) References Cited

U.S. PATENT DOCUMENTS

| | | | | |
|---|---|---|---|---|
| 4,330,209 A * | 5/1982 | Hashimoto et al. | .......... | 356/328 |
| 4,674,880 A * | 6/1987 | Seki | ............ | 356/328 |
| 5,357,351 A * | 10/1994 | Nakajima et al. | ........... | 358/482 |
| 6,054,703 A * | 4/2000 | Liu | .......................... | 250/208.1 |
| 7,084,973 B1 * | 8/2006 | Ingram | ........................ | 356/326 |
| 7,381,938 B2 * | 6/2008 | Kobayashi et al. | ........ | 250/208.1 |
| 7,408,683 B2 * | 8/2008 | Sato et al. | .................... | 358/474 |
| 2003/0058346 A1 * | 3/2003 | Bechtel et al. | ......... | 348/207.99 |
| 2003/0058361 A1 * | 3/2003 | Yang | .......................... | 348/311 |
| 2004/0032628 A1 * | 2/2004 | Sato et al. | .................... | 358/514 |
| 2006/0291006 A1 * | 12/2006 | Hiromatsu | ................... | 358/474 |
| 2007/0285518 A1 * | 12/2007 | Ikeda | .................... | 348/207.99 |

FOREIGN PATENT DOCUMENTS

| | | |
|---|---|---|
| EP | 0 355 174 | 2/1990 |
| EP | 0 399 057 | 11/1990 |
| JP | 54-111878 | 9/1979 |
| JP | 06-011392 | 1/1994 |
| JP | 3102689 | 8/2000 |
| JP | 3572681 | 7/2004 |

\* cited by examiner

*Primary Examiner*—Negussie Worku
(74) *Attorney, Agent, or Firm*—Drinker Biddle & Reath LLP

(57) ABSTRACT

An image sensor 20A contains a photodiode array portion 21, a signal processor 22, a switching instruction part 23A and a control part 24A. Each switch $SW_n$ is provided between the corresponding photodiode $PD_n$ and the common output line L, and instructed to carry out the switching operation by the switching instruction part 23A so as to be closed, whereby the charges accumulated in the junction capacitance portion of the photodiode $PD_n$ are output to the common output line L. On the basis of the instruction from the switching instruction part 23A, the N switches $SW_1$ to $SW_N$ carry out the switching operation so that the N switches $SW_1$ to $SW_N$ are set to the close state in the different periods and the interval at which each switch $SW_n$ is set to the close state is equal to an integral multiple of a base period. As described above, the charge accumulation time of each of the N photodiodes $PD_1$ to $PD_N$ is set to an integral multiple of the base period.

5 Claims, 5 Drawing Sheets

IMAGE SENSOR

BACKGROUND OF THE INVENTION

1. Field of the Invention

The present invention relates to an image sensor containing plural photodiodes.

2. Related Background of the Invention

An image sensor containing plural photodiodes is used for a spectroscopic device, for example. In the spectroscopic device, light in some wavelength band which is output from a light source is made incident to a sample, light which is a part of the incident light and transmitted through the sample is spectroscopically separated by a spectroscope, and then the spectroscopically separated light beams having respective wavelengths are detected by the image sensor. In such a spectroscopic device, it is common that the intensity spectrum $I(\lambda)$ of light output from the light source and the detecting sensitivity spectrum $D(\lambda)$ of each photodiode contained in the image sensor are not flat in wavelength bands used for spectroscopic measurements.

Furthermore, the photodiode generates charges whose amount corresponds to the amount of light received, and accumulates the thus generated charges into a junction capacitance portion. When the junction capacitance portion is electrically connected to another circuit, the charges which have been accumulated in the junction capacitance portion until then are transmitted to the circuit concerned. However, the amount of charges to be accumulated in the junction capacitance portion of the photodiode is limited. When the amount of light received is small, the accumulated charge amount is proportional to the amount of light received, however, when the amount of light received is large, the accumulated charge amount is saturated.

As described above, it is required to set the charge accumulation time in the spectroscopic device so that the accumulated charge amount in the junction capacitance portion of the photodiode is not saturated at a wavelength $\lambda$ at which the product $(I(\lambda) \cdot D(\lambda))$ with the intensity spectrum $I(\lambda)$ of light output from the light source and the detecting sensitivity spectrum $D(\lambda)$ of the photodiode has a peak. An image sensor contained in a spectroscopic device disclosed in Japanese Patent No. 3,572,681 is designed so that the charge accumulation time is set to be as long as possible to the extent that the accumulated charge amount is not saturated at a wavelength $\lambda$ at which the product $(I(\lambda) \cdot D(\lambda))$ has a peak, whereby a spectroscopic measurement having high sensitivity can be performed.

SUMMARY OF THE INVENTION

In the spectroscopic device containing the image sensor as disclosed in the above Patent Document 1, it is possible to carry out a high-sensitivity spectroscopic measurement in a wavelength range where the product $(I(\lambda) \cdot D(\lambda))$ is large. However, in a wavelength range where the product $(I(\lambda) \cdot D(\lambda))$ is small, noise components cannot be disregarded with respect to signal components and thus the sensitivity is low.

The present invention has been implemented to solve the above problem point, and has an object to provide a spectroscopic device that can perform high-sensitivity spectroscopic measurements in each wavelength, and an image sensor suitably used for the spectroscopic device as described above.

An image sensor according to the present invention is characterized by including: (1) N photodiodes $PD_1$ to $PD_N$ each of which generates charges whose amount corresponds to the amount of light received; (2) N switches $SW_1$ to $SW_N$ that are provided in one-to-one correspondence to the N photodiodes $PD_1$ to $PD_N$, each of the N switches being provided between the corresponding photodiode and a common output line; and (3) a switching instruction part for instructing a switching operation of each of the N switches $SW_1$ to $SW_N$. Furthermore, the switching instruction part sets the respective N switches $SW_1$ to $SW_N$ to a close state in different periods, and instructs the switching operation of each switch $SW_n$ so that the interval of the close state of each switch $SW_n$ is equal to an integral multiple of a base period. Here, N represents an integer of 2 or more, and n represents each integer from 1 to N.

In this image sensor, the n-th photodiode $PD_n$ of the N photodiodes $PD_1$ to $PD_N$ and the n-th switch $SW_n$ of the N switches $SW_1$ to $SW_N$ are provided in correspondence with each other. Each switch $SW_n$ is provided between the corresponding photodiode $PD_n$ and the common output line, and it carries out the switching operation in response to an instruction from the switching instruction part to be closed, so that the charges accumulated in the junction capacitance portion of the photodiode $PD_n$ are output to the common output line. On the basis of the instruction from the switching instruction part, the N switches $SW_1$ to $SW_N$ are respectively set to the close state in different periods, and also carry out the switching operation so that the interval at which each of the switches $SW_n$ is set to the close state is equal to an integral multiple of the base period. As described above, the charge accumulation time of each of the N photodiodes $PD_1$ to $PD_N$ is set to an integral multiple of the base period.

The switching instruction part preferably contains (a) a shift register for successively outputting each of switching instruction signals $S_1$ to $S_N$ for instructing the switching operation of the N switches $SW_1$ to $SW_N$ as a value instructing the close state, and (b) N gate circuits $G_1$ to $G_N$ that are provided in one-to-one correspondence to the N switches $SW_1$ to $SW_N$. In this case, it is preferable that each gate circuit $G_n$ inputs the switching instruction signal $S_n$ output from the shift register and also inputs a control signal $T_n$, whereby when the control signal $T_n$ is equal to a first value, each gate circuit $G_n$ directly outputs the switching instruction signal $S_n$ to the switch $SW_n$, and when the control signal $T_n$ is equal to a second value, each gate circuit $G_n$ outputs the switching instruction signal having a value instructing an open state to the switch $SW_n$. It is also preferable that each gate circuit $G_n$ inputs the switching instruction signal $S_n$ output from the shift register and also inputs a common control signal $T_o$, whereby when the control signal $T_o$ is equal to a first value, each gate circuit $G_n$ directly outputs the switching instruction signal $S_n$ to the switch $SW_n$, and when the control signal $T_o$ is equal to a second value, each gate circuit $G_n$ outputs the switching instruction signal having a value instructing an open state to the switch $SW_n$. Each gate circuit $G_n$ is constructed by a logic circuit such as an AND circuit or the like, and the first value and the second value are set so that one of the values is set to a high level while the other is set to a low level.

When the switching instruction part is constructed as described above, each switching instruction signal $S_n$ for instructing the switching operation of the switch $SW_n$ is output from the shift register and input to the gate circuit $G_n$. The switching instruction signal supplied from each gate circuit $G_n$ to the switch $SW_n$ remains as the switching instruction signal $S_n$ when the control signal $T_n$ or the common control signal $T_0$ is equal to the first value, and the switching instruction signal concerned is set to the value instructing the open state when the control signal $T_n$ or the common control signal $T_0$ is equal to the second value. That is, the charge accumulation time of the photodiode $PD_n$ is set to an integral multiple of the base period on the basis of the control signal $T_n$ or the common control signal $T_0$.

The image sensor according to the present invention is preferably further provided with a signal processor for accumulating charges input from each photodiode $PD_n$ through the switch $SW_n$ and the common output line into a variable capacitance portion whose capacitance value is variable, and outputting the voltage value corresponding to the ratio between the amount of charges accumulated in the variable capacitance portion and the capacitance value of the variable capacitance portion. In this case, the charges output from each photodiode $PD_n$ through the switch $SW_n$ to the common output line are input to the signal processor and accumulated in the variable capacitance portion contained in the signal processor, and the voltage value corresponding to the ratio between the amount of charges accumulated in the variable capacitance portion and the capacitance value of the variable capacitance portion is output from the signal processor.

A spectroscopic device according to the present invention is characterized by including: a light source for outputting light; a spectroscope for spectroscopically separating light output from the light source and transmitted through a sample; and the above-described image sensor for receiving light of each wavelength which is spectroscopically separated by the spectroscope. In the spectroscopic device, light which is a part of light output from the light source and transmitted through the sample is spectroscopically separated by the spectroscope and then received by the image sensor.

According to the present invention, a high-sensitivity spectroscopic measurement can be performed at each wavelength.

DESCRIPTION OF THE PREFERRED EMBODIMENTS

Figure 1:
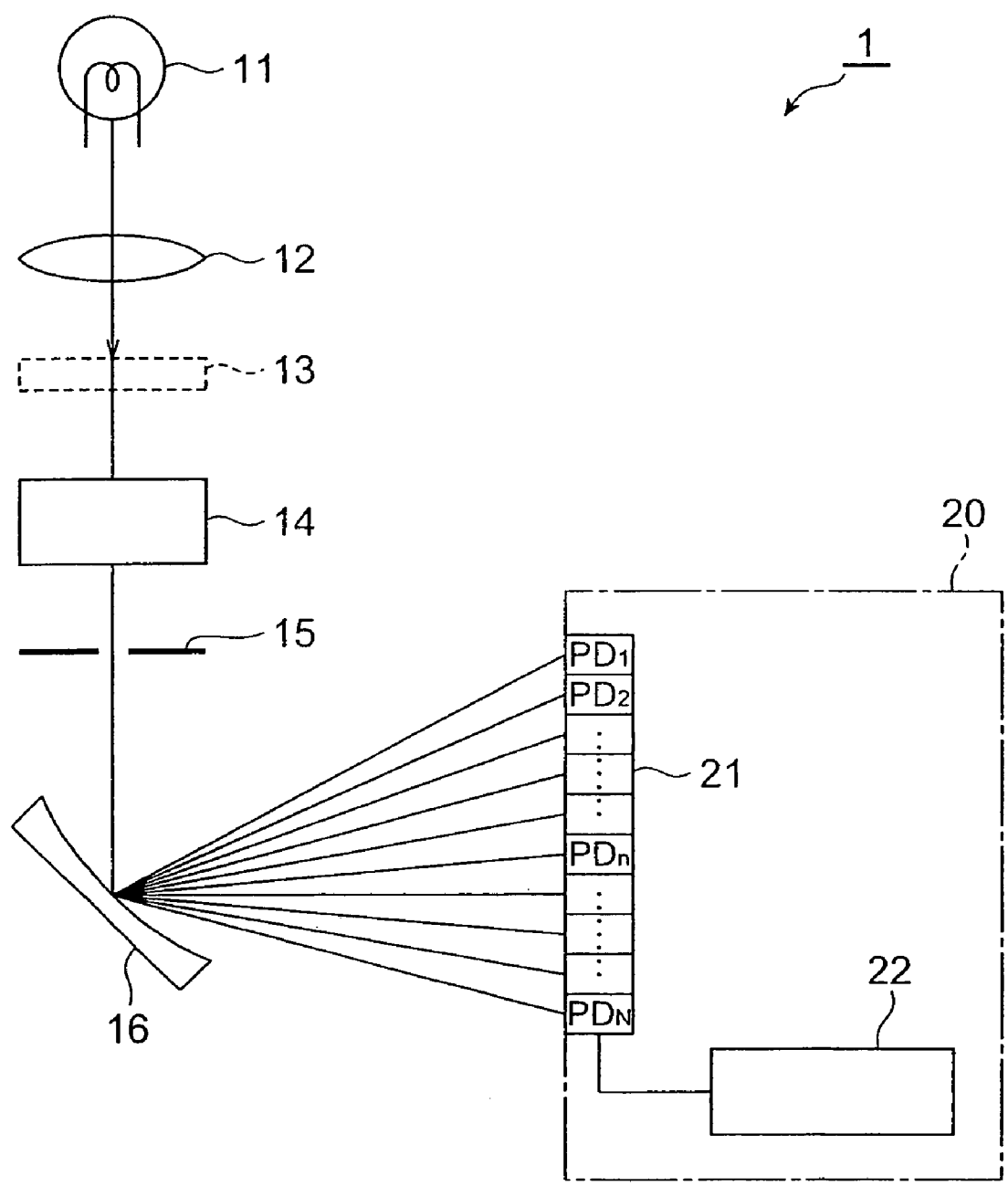
FIG. 1 is a schematic diagram showing the construction of a spectroscopic device 1 according to an embodiment.

Preferred embodiments for implementing the present invention will be described in detail with reference to the accompanying drawings. In the description of the drawings, the same elements are represented by the same reference numerals, and overlapping description thereof is omitted.

Embodiment of Spectroscopic Device

First, an embodiment of the spectroscopic device according to the present invention will be described. FIG. 1 is a diagram showing the construction of the spectroscopic device 1 according to the embodiment. The spectroscopic device 1 shown in FIG. 1 is provided with a light source 11, a lens 12, a shutter 13, a sample cell 14, a slit 15, a diffraction grating 16 and an image sensor 20.

The light source 11 outputs light in some wavelength band, for example. It contains a deuterium lamp and a tungsten lamp, for example, and turns on these two lamps at the same time to output light in a broadband. The lens 12 condenses light output from the light source 11. The shutter 13 is provided at the rear stage of the condensing lens 12, and sets whether light is made incident to the sample cell 14. The sample cell 14 is a cell in which a sample as a measurement target is inserted. Light transmitted through the shutter 13 is made incident to the sample, and light transmitted through the sample is emitted. The diffraction grating 16 is a concave reflection type diffraction grating, and it acts as a spectroscope for inputting light emitted from the sample cell 14 and is then passed through the slit 15 and spectroscopically separates the light thus input.

The image sensor 20 contains a photodiode array portion 21 and a signal processor 22. The photodiode array portion 21 includes N photodiodes $PD_1$ to $PD_N$ arranged, and receives light of each wavelength $\lambda_n$ spectroscopically separated by the diffraction grating 16 by each photodiode $PD_n$. The charge accumulation time in each photodiode $PD_n$ is variable. The signal processor 22 inputs charges output from each photodiode $PD_n$ contained in the photodiode array portion 21 and outputs the voltage value corresponding to the charge amount and the charge accumulation time. Here, N represents an integer of 2 or more, and n represents any integer from not less than 1 to not more than N.

In this spectroscopic device 1, light output from the light source 11 is condensed by the lens 12, passed through the shutter 13 and then incident to the sample in the sample cell 14. Light out of the incident light, which is transmitted through the sample in the sample cell 14, is passed through the slit 15 and then spectroscopically separated by the diffraction grating 16. Light of each wavelength $\lambda_n$ thus spectroscopically separated is received by the photodiode $PD_n$ contained in the photodiode array portion 21. The voltage value corresponding to the amount of charges output from each photodiode $PD_n$ and the charge accumulation time is output from the signal processor 22.

As described above, the spectrum of the light passed through the sample in the sample cell 14 is measured by the image sensor 20. Furthermore, the spectrum of light when no sample is inserted in the sample cell 14 is also measured by the image sensor 20. A transmission spectrum of the sample in the sample cell 14 is determined from the two spectra. It is preferable to carry out dark current correction on the basis of a result measured by the image sensor 20 in a state that the light source 11 is turned off and the shutter 13 is closed. Furthermore, it is also preferable to carry out background correction on the basis of a result measured by the image sensor 20 in a state that the light source 11 is turned off and the shutter 13 is opened.

First Embodiment of Image Sensor

Figure 2:
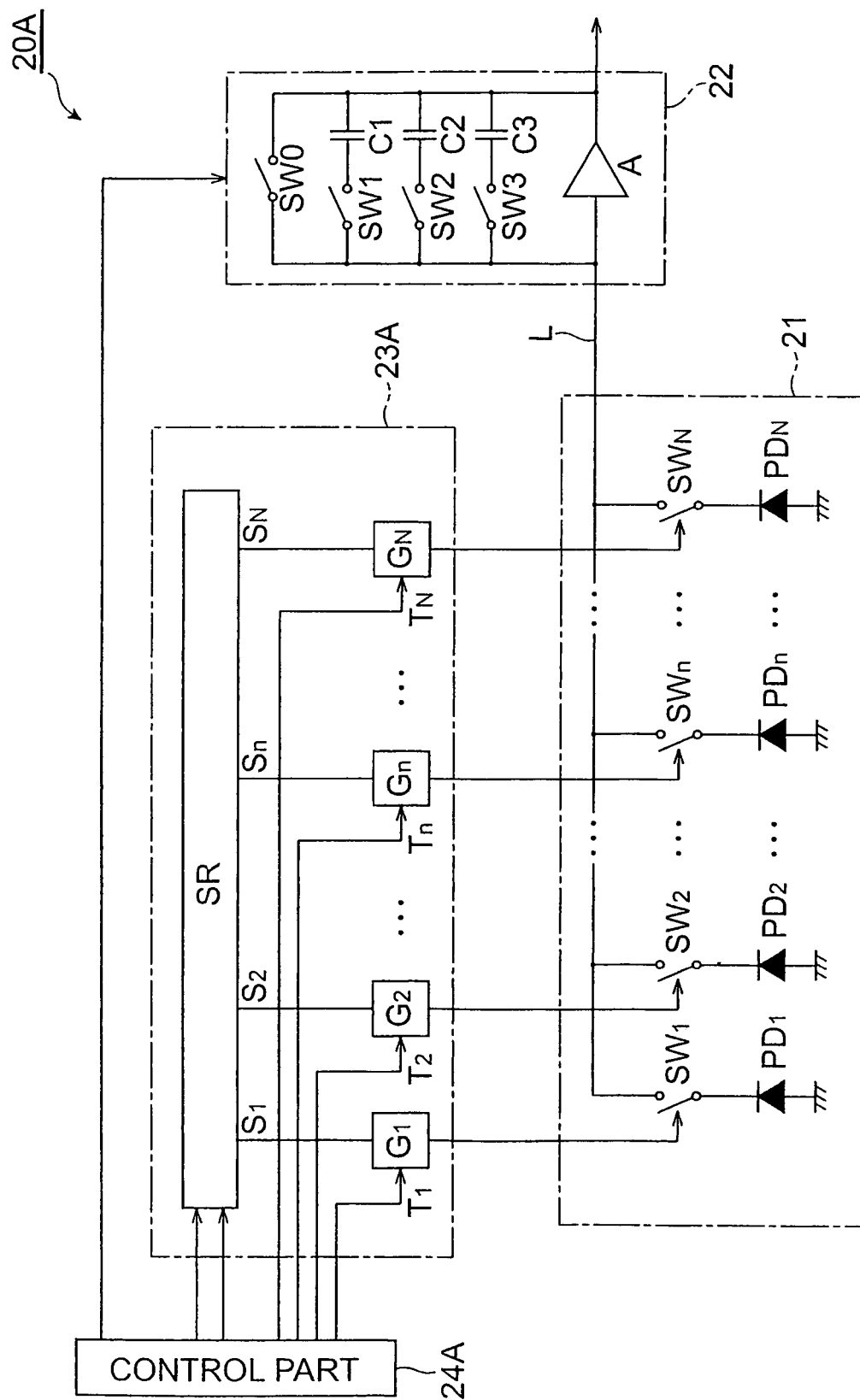
FIG. 2 is a diagram showing the construction of an image sensor 20A according to a first embodiment.

Next, a first embodiment of the image sensor according to the present invention will be described. FIG. 2 is a diagram showing the construction of an image sensor 20A according to the first embodiment. The image sensor 20A shown in FIG. 2 is suitably used as an image sensor 20 contained in the spectroscopic device 1 shown in FIG. 1, and contains a switching instruction part 23A and a control part 24A in addition to the photodiode array portion 21 and the signal processor 22.

The photodiode array portion 21 contains the N photodiode $PD_1$ to $PD_N$ and the N switches $SW_1$ to $SW_N$. With respect to each photodiode $PD_n$, the anode terminal thereof is grounded and the cathode terminal thereof is connected to one end of the switch $SW_n$, and it generates charges whose amount corresponds to the amount of light received. Each photodiode $PD_n$ accumulates the charges into the junction capacitance portion thereof when the switch $SW_n$ is opened, and outputs the charges to a common output line L when the switch $SW_n$ is closed. Each switch $SW_n$ is provided between the corresponding photodiode $PD_n$ and the common output line L.

The signal processor 22 contains an amplifier A, capacitors C1 to C3 and switches SW0 to SW3. The input terminal of the amplifier A is connected to the common output line L. The capacitor C1 and the switch SW1 are connected to each other in series, and provided between the input and output terminals of the amplifier A. The capacitor C2 and the switch SW2 are connected to each other in series and provided between the input and output terminals of the amplifier A. The capacitor C3 and the switch SW3 are connected to each other in series, and provided between the input and output terminals of the amplifier A. The switch SW0 is provided between the input and output terminals of the amplifier A.

The capacitors C1 to C3 and the switches SW1 to SW3 constitute the variable capacitance portion whose capacitance value is variable. The capacitance value of the variable capacitance portion is changed in accordance with the switching state of each of the switches SW1 to SW3. When all the switches SW0 to SW3 are closed, each of the capacitors C1 to C3 is discharged. Furthermore, when the switch SW0 is opened, input charges are accumulated in the variable capacitance portion. The signal processor 22 can accumulate charges input from each photodiode $PD_n$ through the switch $SW_n$ and the common output line L into the variable capacitance portion, and output the voltage value corresponding to the ratio between the charge amount accumulated in the variable capacitance portion and the capacitance value of the variable capacitance portion.

The switching instruction part 23A instructs the switching operation of each of the N switches $SW_1$ to $SW_N$ contained in the photodiode array portion 21. In particular, the switching instruction part 23A instructs the switching operation of each switch $SW_n$ so that the N switches $SW_1$ to $SW_N$ are set to the close state in different periods, and also the interval at which the respective switches $SW_n$ are set to the close state is equal to an integral multiple of a base period T.

Specifically, the switching instruction part 23A contains a shift register SR and N gate circuits $G_1$ to $G_N$. The shift register SR successively outputs the switching instruction signals $S_1$ to $S_N$ for instructing the switching operation of the N switches $SW_1$ to $SW_N$ as a value instructing the close state on the basis of a start signal and a clock signal output from the control part 24A. Each gate circuit $G_n$ is provided in correspondence with the switch $SW_n$. It inputs the switching instruction signal $S_n$ output from the shift register SR, and also inputs a control signal $T_n$ output from the control part 24A. When the control signal $T_n$ is equal to a first value, each gate circuit $G_n$ directly outputs the switching instruction signal $S_n$ to the switch $SW_n$, and when the control signal $T_n$ is equal to a second value, each gate circuit $G_n$ outputs the switching instruction signal having a value indicating the open state to the switch $SW_n$.

A proper logic circuit (AND circuit, OR circuit, NAND circuit, NOR circuit or the like) is selected for each gate circuit $G_n$ in accordance with the polarity of the signal instructing the switching operation of the switch $SW_n$, the polarity of the switching instruction signal $S_n$ output from the shift register SR and the polarity of the control signal $T_n$ output from the control part 24A. For example, it is assumed that the switch $SW_n$ is closed when the signal instructing the switching operation of the switch $SW_n$ is set to a high level, the switching instruction signal $S_n$ instructs the close state of the switch $SW_n$ when the switching instruction signal $S_n$ output from the shift register SR is set to a high level, and the gate circuit $G_n$ directly outputs the switching instruction signal $S_n$ to the switch $SW_n$ when the control signal $T_n$ output from the control part 24A is set to a high level. In this case, the gate circuit $G_n$ may be constructed by an AND circuit. This condition is assumed to be satisfied when the operation is described hereunder.

The control part 24A outputs a signal for controlling the operation of each of the signal processor 22 and the switching instruction part 23A. Specifically, the control part 24A outputs a signal for controlling the switching operation of each of the switches SW0 to SW3 contained in the signal processor 22, outputs the start signal and the clock signal to the shift register SR contained in the switching instruction part 23A, and outputs the control signal $T_n$ to each gate circuit $G_n$ contained in the switching instruction part 23A.

Figure 3:
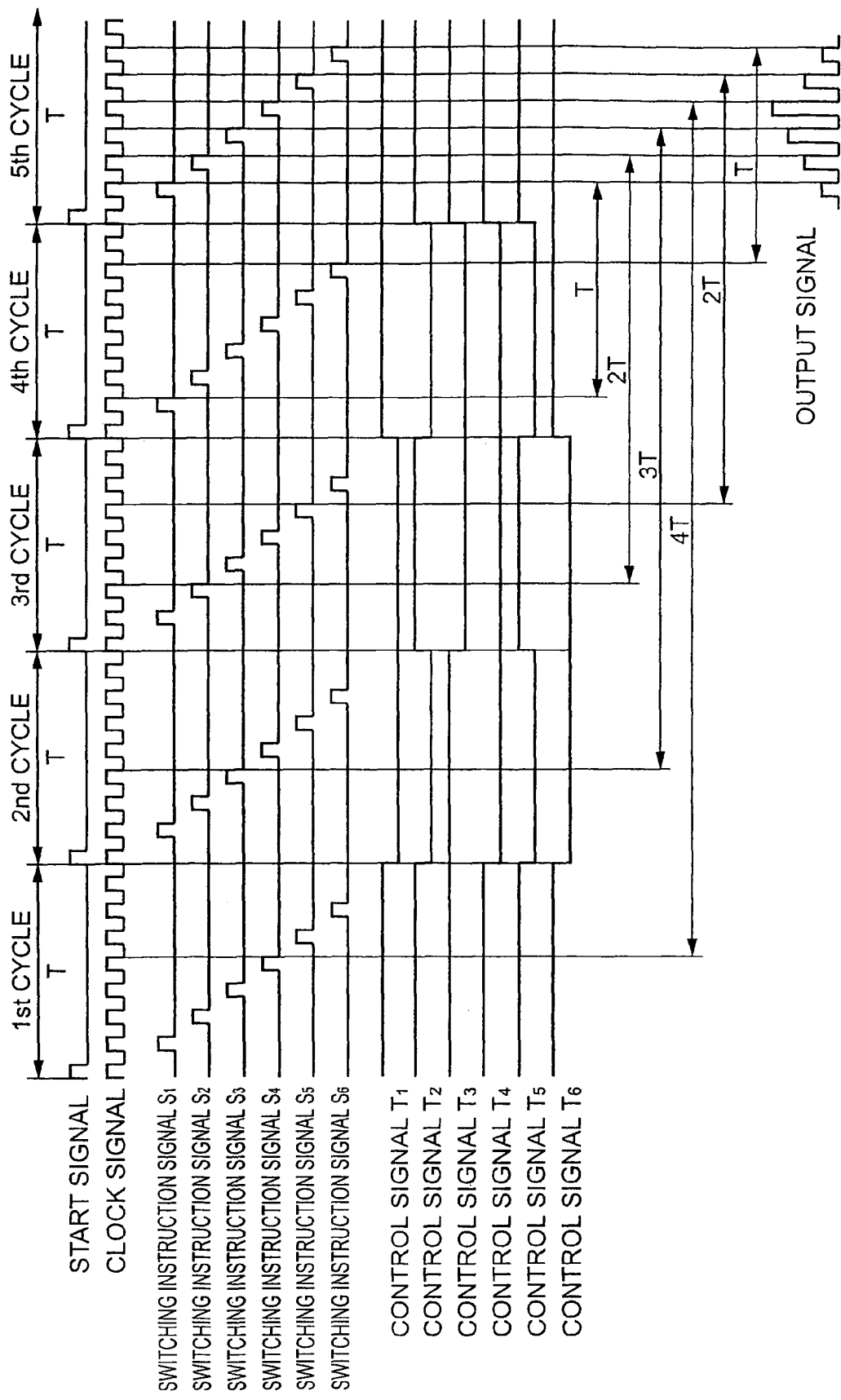
FIG. 3 is a timing chart showing the operation of the image sensor 20A according to the first embodiment.

Next, an example of the operation of the image sensor 20A according to the first embodiment will be described. FIG. 3 is a timing chart showing the operation of the image sensor 20A according to the first embodiment. The start signal and the clock signal supplied from the control part 24A to the shift register SR, the switching instruction signals $S_1$ to $S_6$ output from the shift register SR, the control signals $T_1$ to $T_6$ supplied from the control part 24A to the gate circuits $G_1$ to $G_6$ and the amount of charges passed through the common output line L and input to the signal processor 22 are shown from the upper side in FIG. 3.

In this case, the value of N is set to 6. Furthermore, it is assumed that the switching instruction part 23A instructs the switching operation of each switch $SW_n$ so that the interval at which each switch $SW_n$ is set to the close state is equal to be one to four times as long as the base period T. The capacitance values of the capacitors C1 to C3 contained in the signal processor 22 may be set to C, 2C and 4C, and the capacitance value of the variable capacitance portion may be set to any one of C, 2C, 3C (=C+2C) and 4C. The following operation is carried out under the control of the control part 24A.

Each of the start signal and the clock signal supplied from the control part 24A to the shift register SR is a periodic signal whose level is varied at a fixed period. The period of the start signal is represented by T, and the period of the clock signal is shorter than T. In the following description, the period from some rising time of the start signal until the next rising time is referred to as "cycle." The time of each cycle is equal to T. Furthermore, the clock signal contains at least N (in this case, N=6) pulses for the period from some falling time of the start signal until the next rising time.

The shift register SR is initialized at the rising time of the start signal, and then the switching instruction signals $S_1$ to $S_6$ for instructing the switching operation of the respective switches $SW_1$ to $SW_6$ are successively output as a value instructing the close state at each rising time of the subsequent clock signal. That is, in each cycle, the switching instruction signals $S_1$ to $S_6$ output from the shift register SR are successively set to a high level.

The control signals $T_1$ to $T_6$ supplied from the control part 24A to the gate circuits $G_1$ to $G_6$ are as follows. Each of the control signals $T_1$ and $T_6$ is set to a high level in a first cycle, to a low level in second and third cycles, and to a high level in fourth and fifth cycles. Each of the control signals $T_2$ and $T_5$ is set to a high level in the first cycle, to a low level in the second cycle, to a high level in the third cycle, to a low level in the fourth cycle, and to a high level in the fifth cycle. The control signal $T_3$ is set to a high level in the first and second cycles, to a low level in the third and fourth cycles, and to a high level in the fifth cycle. Furthermore, the control signal $T_4$ is set to a high level in the first cycle, to a low level in the second to fourth cycles and to a high level in the fifth cycle.

The switching instruction signal output from each gate circuit $G_n$ to the switch $SW_n$ is still the switching instruction signal $S_n$ output from the shift register SR during the cycle in which the control signal $T_n$ is set to a high level, however, it has a value instructing the open state during the cycle in which the control signal $T_n$ is set to a low level. That is, the switching instruction signal supplied from each gate circuit $G_n$ to the switch $SW_n$ has a value instructing the close state when both the switching instruction signal $S_n$ output from the shift register SR and the control signal $T_n$ are set to a high level, and it has a value instructing the open state when any one of the switching instruction signal $S_n$ and the control signal $T_n$ is set to a low level.

Accordingly, the switching instruction signal output from the gate circuit $G_1$ to the switch $SW_1$ is still the switching instruction signal $S_1$ output from the shift register SR in the first, fourth and fifth cycles, however, it has a value instructing the open state in the other cycles. The switching instruction signal output from the gate circuit $G_2$ to the switch $SW_2$ is still the switching instruction signal $S_2$ output from the shift register SR in the first, third and fifth cycles, however, it has a value instructing the open state in the other cycles.

The switching instruction signal output from the gate circuit $G_3$ to the switch $SW_3$ is still the switching instruction signal $S_3$ output from the shift register SR in the first, second and fifth cycles, however, it has a value instructing the open state in the other cycles. The switching instruction signal output from the gate circuit $G_4$ to the switch $SW_4$ is still the switching instruction signal $S_4$ output from the shift register SR in the first and fifth cycles, however, it has a value instructing the open state in the other cycles.

The switching instruction signal output from the gate circuit $G_5$ to the switch $SW_5$ is still the switching instruction signal $S_5$ output from the shift register SR in the first, third and fifth cycles, however, it has a value instructing the open state in the other cycles. The switching instruction signal output from the gate circuit $G_6$ to the switch $SW_6$ is still the switching instruction signal $S_6$ output from the shift register SR in the first, fourth and fifth cycles, however, it has a value instructing the open state in the other cycles.

Each switch $SW_n$ contained in the photodiode array portion 21 is closed for some period when the switching instruction signal arriving from the gate circuit $G_n$ is set to a high level, and opened in another period. In each of the first and fifth cycles, the switches $SW_1$ to $SW_6$ are successively closed.

The switch $SW_1$ is closed when the switching instruction signal $S_1$ is set to a high level during the fifth cycle, whereby the charges accumulated in the junction capacitance portion of the photodiode $PD_1$ are output to the signal processor 22 via the common output line L during the period T subsequent to the time when the switching instruction signal $S_1$ is set to a high level during the preceding fourth cycle. The switch $SW_2$ is closed when the switching instruction signal $S_2$ is set to a high level during the fifth cycle, whereby the charges accumulated in the junction capacitance portion of the photodiode $PD_2$ are output to the signal processor 22 via the common output line L during the time 2T subsequent to the time when the switching instruction signal $S_2$ is set to a high level during the preceding third cycle.

The switch $SW_3$ is closed when the switching instruction signal $S_3$ is set to a high level during the fifth cycle, whereby the charges accumulated in the junction capacitance portion of the photodiode $PD_3$ are output to the signal processor 22 via the common output line L during the time 3T subsequent to the time when the switching instruction signal $S_3$ is set to a high level during the preceding second cycle. The switch $SW_4$ is closed when the switching instruction signal $S_4$ is set to a high level during the fifth cycle, whereby the charges accumulated in the junction capacitance portion of the photodiode $PD_4$ are output to the signal processor 22 via the common output line L during the time 4T subsequent to the time when the switching instruction signal $S_4$ is set to a high level during the preceding first cycle.

The switch $SW_5$ is closed when the switching instruction signal $S_5$ is set to a high level during the fifth cycle, whereby the charges accumulated in the junction capacitance portion of the photodiode $PD_5$ are output to the signal processor 22 via the common output line L during the time 2T subsequent to the time when the switching instruction signal $S_5$ is set to a high level during the preceding third cycle. The switch $SW_6$ is closed when the switching instruction signal $S_6$ is set to a high level during the fifth cycle, whereby the charges accumulated in the junction capacitance portion of the photodiode $PD_6$ are output to the signal processor 22 via the common output line L during the period T subsequent to the time when the switching instruction signal $S_6$ is set to a high level during the preceding fourth cycle.

As described above, the charges passed through the common output line L and then input to the processor 22 in the fifth cycle correspond to the charges accumulated in the junction capacitance portion during the period T with respect to the photodiode PD1, the charges accumulated in the junction capacitance portion during the time 2T with respect to the photodiode $PD_2$, the charges accumulated in the junction capacitance portion during the time 3T with respect to the photodiode $PD_3$, the charges accumulated in the junction capacitance portion during the time 4T with respect to the photodiode $PD_4$, the charges accumulated in the junction capacitance portion during the time 2T with respect to the photodiode $PD_5$, and the charges accumulated in the junction capacitance portion during the period T with respect to the photodiode $PD_6$. As described above, the interval at which each switch $SW_n$ is set to the close state is equal to an integral multiple of the base period T, whereby the charge accumulation time in each photodiode $PD_n$ is also equal to an integral multiple of the base period T.

In the fifth cycle, the charges which are passed from each photodiode $PD_n$ through the switch $SW_n$ and the common output line L and then input to the signal processor 22 are accumulated in the variable capacitance portion of the signal processor 22, and the voltage value corresponding to the ratio between the amount of charges accumulated in the variable capacitance portion and the capacitance value of the variable capacitance portion is output from the signal processor 22. The capacitance value of the variable capacitance portion is set in proportion to the charge accumulation time in each photodiode $PD_n$ for generating charges to be accumulated.

That is, when the charges input from the photodiode $PD_1$ are accumulated in the variable capacitance portion, the capacitance value of the variable capacitance portion is set to C. When the charges input from the photodiode $PD_2$ are accumulated in the variable capacitance portion, the capacitance value of the variable capacitance portion is set to 2C. When the charges input from the photodiode $PD_3$ are accumulated in the variable capacitance portion, the capacitance value of the variable capacitance portion is set to 3C. When the charges input from the photodiode $PD_4$ are accumulated in the variable capacitance portion, the capacitance value of the variable capacitance portion is set to 4C. When the charges input from the photodiode $PD_5$ are accumulated in the variable capacitance portion, the capacitance value of the variable capacitance portion is set to 2C. When the charges input from the photodiode $PD_6$ are accumulated in the variable capacitance portion, the capacitance value of the variable capacitance portion is set to C.

As described above, in the image sensor 20A according to the first embodiment, the interval at which each switch $SW_n$ is set to the close state is set to an integral multiple of the base period T, whereby the charge accumulation time in each photodiode $PD_n$ can be set to an integral multiple of the base period T. Accordingly, with respect to each photodiode $PD_n$, the charge accumulation time can be changed to the extent that the accumulated charge amount in the junction capacitance portion is not saturated. Accordingly, the spectroscopic device 1 provided with the image sensor 20A as described above can perform high-sensitivity spectroscopic measurements in each wavelength.

Furthermore, with respect to each photodiode $PD_n$, by changing the capacitance value of the variable capacitance portion of the signal processor 22 in accordance with the charge accumulation time, the effect caused by the difference in charge accumulation time between the respective photodiodes $PD_n$ is excluded from the voltage value output from the signal processor 22.

For example, the setting of the charge accumulating time in each photodiode $PD_n$ is carried out as follows. First, in the state that the charge accumulation time in each of the photodiodes $PD_1$ to $PD_N$ is set as the base period T and the capacitance value of the variable capacitance portion of the signal processor 22 is set to C, when light having excessive intensity is made incident to each photodiode $PD_n$ and the accumulated charge amount in the junction capacitance portion of the photodiode $PD_n$ is saturated, the voltage value $V_{sat}$ output from the signal processor 22 is determined. Furthermore, in this state, light to be measured is made incident to each photodiode $PD_n$, and the voltage value $V_n$, output from the signal processor 22 is determined. On the basis of the ratio ($V_{sat}/V_n$) between the voltage value $V_{sat}$ and the voltage value $V_n$, it is determined how many times the base period T should be multiplied to achieve the charge accumulation time in the photodiode $PD_n$.

Second Embodiment of Image Sensor

Figure 4:
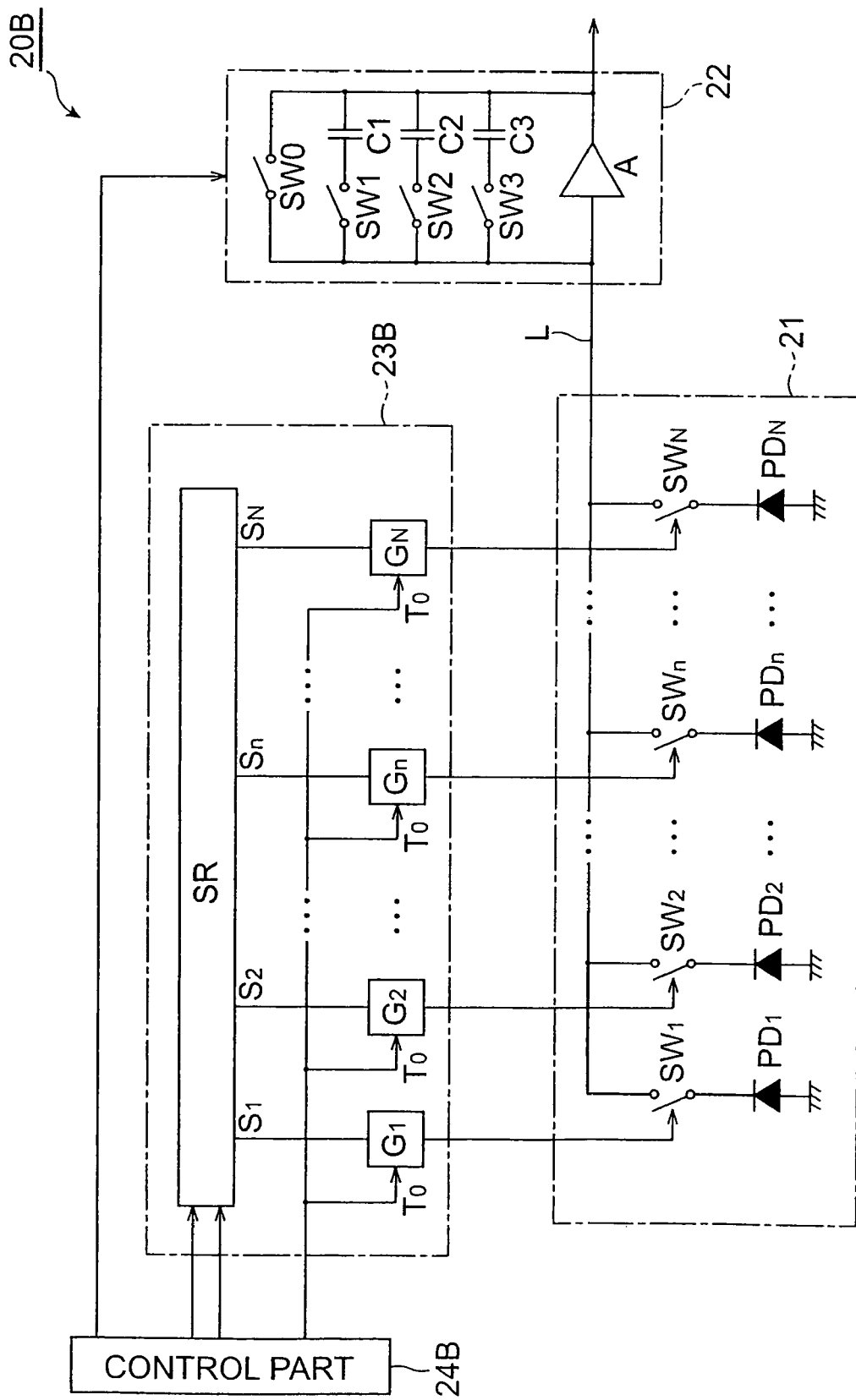
FIG. 4 is a diagram showing the construction of an image sensor 20B according to a second embodiment.

Next, a second embodiment of the image sensor according to the present invention will be described. FIG. 4 is a diagram showing the construction of an image sensor 20B according to the second embodiment. The image sensor 20B shown in FIG. 4 is suitably used as the image sensor 20 contained in the spectroscopic device 1 shown in FIG. 1, and it further contains a switching instruction part 23B and a control part 24B in addition to the photodiode array portion 21 and the signal processor 22.

As compared with the image sensor 20A according to the first embodiment shown in FIG. 2, the image sensor 20B according to the second embodiment shown in FIG. 4 has the same construction with respect to the photodiode array portion 21 and the signal processor 22, however, it is different in that it contains a switching instruction part 23B in place of the switching instruction part 23A, and also in that it contains a control part 24B in place of the control part 24A.

The switching instruction part 23B instructs the switching operation of each of the N switches $SW_1$ to $SW_N$ contained in the photodiode array portion 21. Particularly, the switching instruction part 23B instructs the switching operation of each switch $SW_n$ so that the N switches $SW_1$ to $SW_N$ are set to the close state in different periods, and also the interval at which each switch $SW_n$ is set to the close state is equal to an integral multiple of the base period T.

Specifically, the switching instruction part 23B contains the shift register SR and the N gate circuits $G_1$ to $G_N$. On the basis of the start signal and the clock signal output from the control part 24B, the shift register SR successively outputs the switching instruction signals $S_1$ to $S_N$ for instructing the switching operation of the respective N switches $SW_1$ to $SW_N$ as a value instructing the close state. Each gate circuit $G_n$ is provided in correspondence with the switch $SW_n$. It inputs the switching instruction signal $S_n$ output from the shift register SR and also inputs a common control signal $T_0$ output from the control part 24B. When the control signal $T_0$ is equal to a first value, each gate circuit $G_n$ directly outputs the switching instruction signal $S_n$ to the switch $SW_n$, and when the control signal $T_0$ is equal to a second value, each gate circuit $G_n$ outputs the switching instruction signal having a value instructing the open state to the switch $SW_n$.

For each gate circuit $G_n$, a proper logic circuit (AND circuit, OR circuit, NAND circuit, NOR circuit or the like) is selected in accordance with the polarity of a signal instructing the switching operation of the switch $SW_n$, the polarity of the switching instruction signal $S_n$ output from the shift register SR and the polarity of the control signal $T_0$ output from the control part 24B. For example, it is assumed that when the signal instructing the switching operation of the switch $SW_n$ is set to a high level, the switch $SW_n$ is closed, when the switching instruction signal $S_n$ output from the shift register SR is set to a high level, the switching instruction signal $S_n$ instructs the close state of the switch $SW_n$ and when the control signal $T_0$ output from the control part 24B is set to a high level, the gate circuit $G_n$ directly outputs the switching instruction signal $S_n$ to the switch $SW_n$. In this case, the gate circuit $G_n$ may be constructed by an AND circuit. This condition is satisfied when the operation is described below.

The control part 24B outputs signals for controlling the operation of the signal processor 22 and the switching instruction part 23B. Specifically, the control part 24B outputs a signal for controlling the switching operation of each of the switches SW0 to SW3 contained in the signal processor 22, outputs the start signal and the clock signal to the shift register SR contained in the switching instruction part 23B and outputs the common control signal $T_0$ to each gate circuit $G_n$ contained in the switching instruction part 23B.

Figure 5:
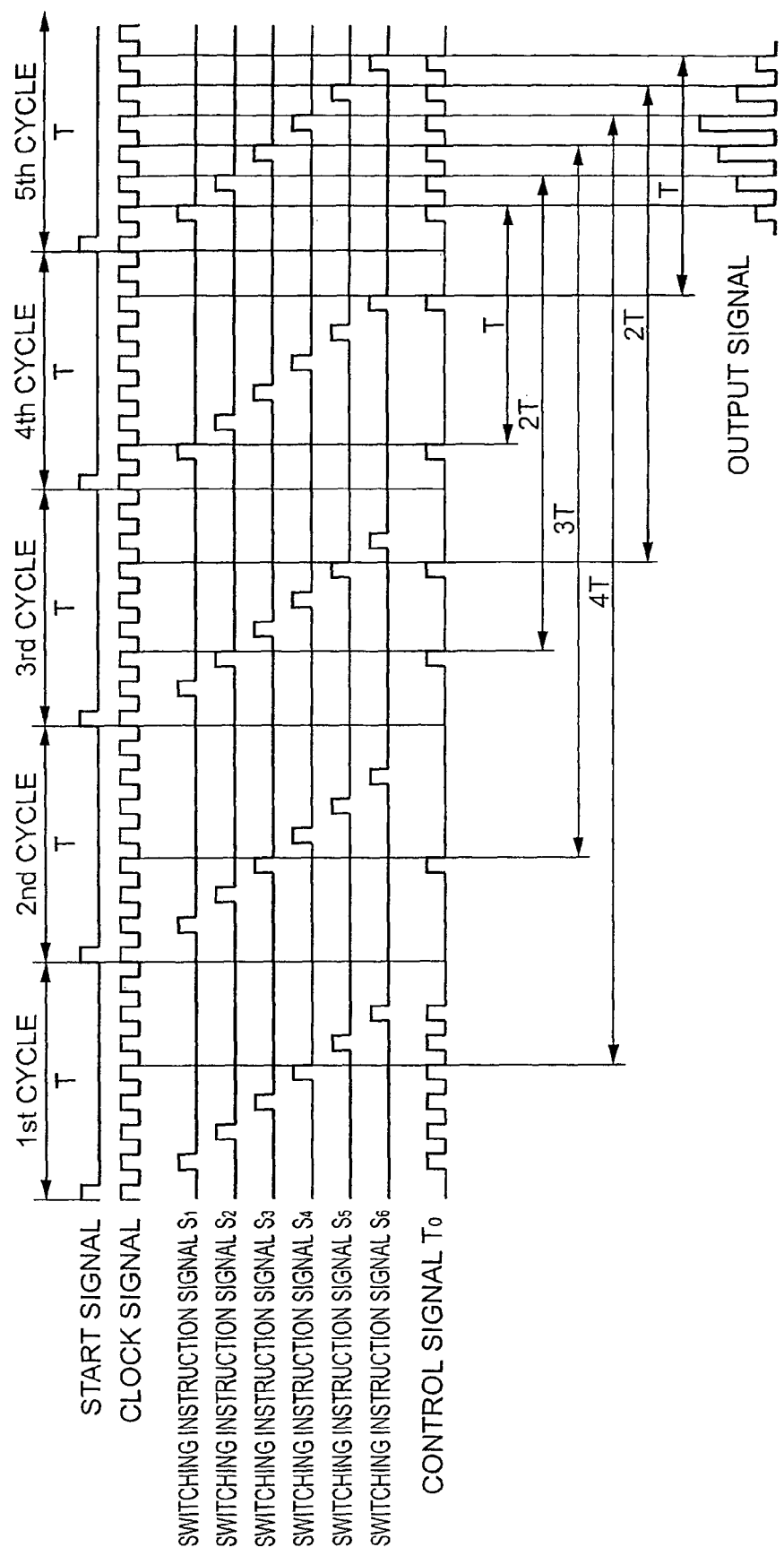
FIG. 5 is a timing chart showing the operation of the image sensor 20B according to the second embodiment.

Next, an example of the operation of the image sensor 20B according to the second embodiment will be described. FIG. 5 is a timing chart showing the operation of the image sensor 20B according to the second embodiment. The start signal and the clock signal supplied from the control part 24B to the shift register SR, the switching instruction signals $S_1$ to $S_6$ output from the shift register SR, the common control signal $T_0$ supplied from the control part 24B to the gate circuits $G_1$ to $G_6$ and the amount of charges input to the signal processor 22 through the common output line L are shown from the upper side in FIG. 5.

In this case, the value of N is set to 6. The switching instruction part 23B instructs the switching operation of each switch $SW_n$ so that the interval at which each switch $SW_n$ is set to the close state is set to one to four times of the base period T. The capacitance values of the capacitors C1 to C3 contained in the signal processor 22 are set to C, 2C and 4C, and the capacitance value of the variable capacitance portion is set to any one of C, 2C, 3C (=C+2C) and 4C. The following operation is carried out under the control of the control part 24B.

The start signal and the clock signal supplied from the control part 24B to the shift register SR and the switching instruction signals $S_1$ to $S_6$ output from the shift register SR are the same as the first embodiment.

The common control signal $T_0$ supplied from the control part 24B to the gate circuits $G_1$ to $G_6$ is as follows. In the first and fifth cycles, the control signal $T_0$ is set to a high level during the period when any one of the switching instruction signals $S_1$ to $S_6$ output from the shift register SR is set to a high level, and in the other period, the control signal $T_0$ is set to a low level. In the second cycle, during the period when the switching instruction signal $S_3$ output from the shift register SR is set to a high level, the control signal $T_0$ is set to a high level, and in the other period, the control signal $T_0$ is set to a low level. In the third cycle, during the period when the switching instruction signal $S_2$ or $S_5$ output from the shift register SR is set to high period, the control signal $T_0$ is set to a high level, and in the other period, the control signal $T_0$ is set to a low level. In the fourth cycle, during the period when the switching instruction signal $S_1$ or $S_6$ output from the shift register SR is set to a high level, the control signal $T_0$ is set to a high level, and in the other period, the control signal $T_0$ is set to a low level.

The switching instruction signal output from each gate circuit $G_n$ to the switch $SW_n$ is still the switching instruction signal $S_n$ output from the shift register SR for the period when the control signal $T_0$ is set to a high level, however, it has a value instructing the open state during the period when the control signal $T_0$ is set to a low level. That is, the switching instruction signal from each gate circuit $G_n$ to the switch $SW_n$ has a value instructing the close state when both the switching instruction signal $S_n$ output from the shift register SR and the control signal $T_0$ are set to a high level, however, it has a value instructing the open state when any one of the switching instruction signal $S_n$ and the control signal $T_0$ is set to a low level.

Accordingly, the switching instruction signal output from the gate circuit $G_1$ to the switch $SW_1$ is still the switching instruction signal $S_1$ output from the shift register SR in the first, fourth and fifth cycles, however, it has a value instructing the open state in the other cycles. The switching instruction signal output from the gate circuit $G_2$ to the switch $SW_2$ is still the switching instruction signal $S_2$ output from the shift register SR in the first, third and fifth cycles, however, it has a value instructing the open state in the other cycles.

The switching instruction signal output from the gate circuit $G_3$ to the switch $SW_3$ is still the switching instruction signal $S_3$ output from the shift register SR in the first, second and fifth cycles, however, it has a value instructing the open state in the other cycles. The switching instruction signal output from the gate circuit $G_4$ to the switch $SW_4$ is still the switching instruction signal $S_4$ output from the shift register SR in the first and fifth cycles, however, it has a value instructing the open state in the other cycles.

The switching instruction signal output from the gate circuit $G_5$ to the switch $SW_5$ is still the switching instruction signal $S_5$ output from the shift register SR in the first, third and fifth cycles, however, it has a value instructing the open state in the other cycles. The switching instruction signal output from the gate circuit $G_6$ to the switch $SW_6$ is still the switching instruction signal $S_6$ output from the shift register SR in the first, fourth and fifth cycles, however, it has a value instructing the open state in the other cycles.

Each switch $SW_n$ contained in the photodiode array portion 21 is closed during the period when the switching instruction signal arriving from the gate circuit $G_n$ is set to a high level, and it is opened in the other period. As a result, in the operation of the second embodiment, the switching operation of each switch $SW_n$ and the operation of the signal processor 22 are the same as the operation of the first embodiment.

As described above, according to the image sensor 20B according to the second embodiment, by setting the interval of the close state of each switch $SW_n$ to an integral multiple of the base period T, the charge accumulation time in each photodiode $PD_n$ can be set to an integral multiple of the base period T, whereby the charge accumulation time can be changed to the extent that the accumulated charge amount in the junction capacitance portion with respect to each photodiode $PD_n$ is not saturated. Accordingly, the spectroscopic device 1 having the image sensor 20B as described above can perform high-sensitivity spectroscopic measurement in each wavelength.

Furthermore, by changing the capacitance value of the variable capacitance portion of the signal processor 2 in accordance with the charge accumulation time with respect to each photodiode $PD_n$, the effect caused by the difference in charge accumulation time among the respective photodiodes $PD_n$ is excluded from the voltage value output from the signal processor 22.

Furthermore, as compared with the construction of the image sensor 20A of the first embodiment, in the image sensor 20B of the second embodiment, the common control signal $T_0$ is supplied from the control part 24B to the N gate circuits $G_1$ to $G_N$, and thus it is sufficient to provide only one wire for the control signal $T_0$. Accordingly, the image sensor 20B according to the second embodiment can be miniaturized, and thus manufactured at a low price.

What is claimed is:

1. An image sensor comprising:
   N photodiodes $PD_1$ to $PD_N$ each of which generates charges whose amount corresponds to the amount of light received,
   N switches $SW_1$ to $SW_N$ that are provided in one-to-one correspondence to the N photodiodes $PD_1$ to $PD_N$, each of the N switches being provided between the corresponding photodiode and common output line, N representing an integer of 2 or more, and n representing an integer from not less than 1 to not more than N; and
   a switching instruction part for instructing the switching operation of each of the N switches $SW_1$ to $SW_N$, wherein
   the switching instruction part instructs the switching operation of each switch $SW_n$ so that the N switches $SW_1$ to $SW_N$ are set to a close state in different periods, and an interval at which each switch state $SW_n$ is set to the close state is equal to an integral multiple of a base period, and
   wherein the switching instruction part includes
   a shift register for successively outputting switching instruction signals $S_1$ to $S_N$ for instructing the switching operation of each of the N switches $SW_1$ to $SW_N$ as a value instructing the close state, and
   N gate circuits $G_1$ to $G_N$ provided in one-to-one correspondence to the N switches $SW_1$ to $SW_N$, wherein
   each gate circuit $G_n$ inputs a switching instruction signal $S_n$ output from the shift register.

2. The image sensor according to claim 1, wherein each gate circuit $G_n$ also inputs a control signal $T_n$, and each gate circuit $G_n$ directly outputs the switching instruction signal $S_n$ to a switch $SW_n$ when the control signal $T_n$ is equal to a first value, and outputs a switching instruction signal having a value instructing an open state to the switch $SW_n$ when the control signal $T_n$ is equal to a second value.

3. The image sensor according to claim 1, wherein each gate circuit $G_n$ also inputs a common control signal $T_0$, whereby when the control signal $T_0$ is equal to a first value, each gate circuit $G_n$ directly outputs the switching instruction signal $S_n$ to the switch $SW_n$, and when the control signal $T_O$ is equal to a second value, each gate circuit $G_n$ outputs the switching instruction signal having a value instructing the open state to the switch $SW_n$.

4. The image sensor according to claim 1, further comprising a signal processor for accumulating charges input from each photodiode $PD_n$ through the switch $SW_n$ and the common output line into a variable capacitance portion whose capacitance value is variable, and outputting the voltage value corresponding to the ratio between the amount of charges accumulated in the variable capacitance portion and the capacitance value of the variable capacitance portion.

5. A spectroscopic device comprising a light source for outputting light, a spectroscope for spectroscopically separating light output from the light source and transmitted through a sample, and the image sensor according to claim 1 for receiving light of each wavelength which is spectroscopically separated by the spectroscope.

* * * * *